United States Patent
Chen et al.

[19]

[11] Patent Number: 6,122,023
[45] Date of Patent: Sep. 19, 2000

[54] NON-SPECKLE LIQUID CRYSTAL PROJECTION DISPLAY

[75] Inventors: Diana Chen, Gilbert; Michael S. Lebby, Apache Junction; Karen E. Jachimowicz, Laveen, all of Ariz.

[73] Assignee: Motorola, Inc., Schaumburg, Ill.

[21] Appl. No.: 09/123,612

[22] Filed: Jul. 28, 1998

[51] Int. Cl.[7] ........................ G02F 1/1333; G02F 1/1335
[52] U.S. Cl. ................... 349/86; 349/5; 349/193; 359/443
[58] Field of Search .................... 359/443, 446, 359/452; 349/1, 5, 193; 344/86

[56] References Cited

U.S. PATENT DOCUMENTS

| | | | |
|---|---|---|---|
| 3,650,608 | 3/1972 | Baker | 353/69 |
| 4,613,207 | 9/1986 | Fergason | 349/86 |
| 4,699,468 | 10/1987 | Harasim et al. | 349/1 |
| 5,416,617 | 5/1995 | Loiseaux et al. | 349/1 |
| 5,473,454 | 12/1995 | Blanchard | 349/112 |

*Primary Examiner*—Kenneth Parker
*Attorney, Agent, or Firm*—Eugene A. Parsons; William E. Koch

[57] ABSTRACT

A non-speckle laser projection display composed of a liquid crystal material for the generation of a high resolution, non-speckle image. The projection display screen includes a liquid crystal material which is constructed in a highly scattered state when no drive voltage is applied. When a high frequency, low voltage signal is applied to the liquid crystal projection display screen, the liquid crystal molecules vibrate slightly at a frequency higher than 60 Hz, thereby causing the speckle pattern to change quickly, and causing the eye to smooth out and see no speckle. In addition, provided is a non-speckle laser display system in which included is a laser image source and the liquid crystal projection display screen.

13 Claims, 2 Drawing Sheets

NON-SPECKLE LIQUID CRYSTAL PROJECTION DISPLAY

FIELD OF THE INVENTION

The present invention pertains to the field of visual displays, and more particularly to display screens that utilize liquid crystal materials to generate a high resolution image within an observer's field of view.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Included within these visual displays are direct view displays, including projection displays. Of concern in the use of projection displays is the display resolution quality and the maintenance of minimal power requirements and low manufacturing costs.

Of relevance in the maintenance of resolution quality, is the human visual system's ability to process and integrate information, and the speed at which the visual system is able to do so. One of the greatest problems associated with laser projection displays is "speckle" in the image due to the light reflecting off the screen, then interfering with itself, and causing "speckle" to the human eye. In theory, "speckle" is defined as the random intensity variation that is caused by the random interference of the light. Accordingly, a common solution to the problem of "speckle" in displays is to vibrate the screen at a high frequency, thereby causing the speckle pattern to change quickly and smooth out so the eye does not see it. This type of display requires the mechanical movement of the display screen, thus complex and costly to operate.

In theory, the human visual system can process and interpret information no faster than approximately 60 Hz. Therefore, by incorporating a display that has applied thereto a drive frequency, or voltage, so as to vibrate included liquid crystal molecules at a frequency higher than 60 Hz, "speckle" in the display can be eliminated. Accordingly, the human eye will average the speckle effect and the pattern will be smoothed out, i.e. no "speckle" will be observed. This process, can be utilized in the field of display technology through the use of liquid crystal projection displays, and more specifically in the development of enhanced resolution visual displays, including projection displays.

Thus, there is a need for a projection display that eliminates the need for mechanical movement of the screen to allow for the viewing of a high resolution image without speckle. Thus, disclosed is a display screen, including a liquid crystal material, that allows for the generation of a high resolution display, by applying a voltage to the liquid crystal molecules included therein, causing them to vibrate slightly, and thereby smooth out the "speckle" typically observed.

Accordingly, it is highly desirable to provide for a projection display in which included is a liquid crystal material capable of undergoing a reaction in the presence of a drive frequency, and thereby eliminating "speckle" when viewing the display.

It is a further purpose of the present invention to provide a new and improved non-speckle laser display in which no mechanical movement is involved in the generation of a projection display.

It is yet a further purpose of the present invention to provide a new and improved non-speckle laser display in which a projection display screen including a liquid crystal material, having a high frequency, low voltage applied thereto provides for a non-speckle, high resolution image.

It is still a further purpose of the present invention to provide a new and improved non-speckle laser display system that includes a laser image source and a projection display screen including a liquid crystal material, for the generation of a non-speckle, high resolution image.

It is a purpose of the present invention to provide a new and improved projection display system including a laser diode image source and a liquid crystal projection screen for use in videoconferencing systems, cellular phones, personal digital assistants (PDAs), pagers, portable computers, or the like.

SUMMARY OF THE INVENTION

The above problems and others are substantially solved and the above purposes and others are realized in a non-speckle laser projection display screen including a liquid crystal material for the generation of a high resolution, non-speckle image. The liquid crystal projection display screen is constructed in a highly scattering state. When a high frequency, low voltage signal is applied to the liquid crystal projection display screen, the liquid crystal molecules vibrate slightly at a frequency higher than 60 Hz, thereby causing the speckle pattern to change quickly, and causing the eye to smooth out and see no speckle. In addition, provided is a non-speckle laser display system in which included is a laser image source and the liquid crystal projection display screen.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENTS

During the course of this description, like numbers are used to identify like elements according to the different figures that illustrate the invention. The present invention is based on utilizing a liquid crystal material to compose a projection display screen, that under the influence of a high frequency, low voltage provides for the vibrating of the included liquid crystal molecules, thereby providing for a non-speckle laser projection display. If the movement, or vibrating, of the molecules is on the order of one wavelength with a frequency higher than 60 Hz, the speckle pattern will change quickly. This change allows for the human eye to average the speckle effect and the pattern is smoothed out, accordingly no speckle will be observed in the displayed image.

Figure 1:
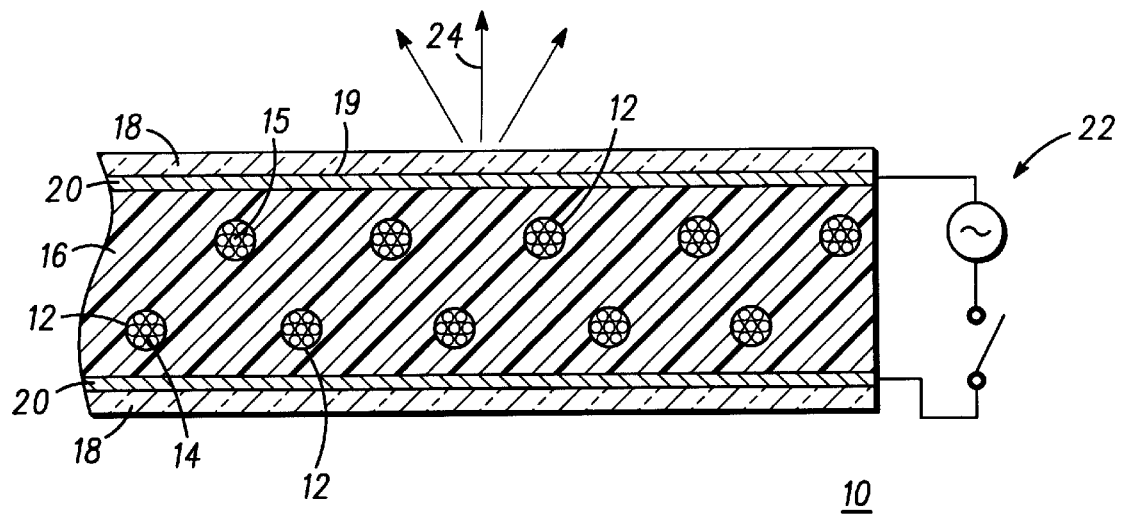
FIG. 1 is a simplified sectional view, illustrating a portion of a liquid crystal projection display screen including a liquid crystal material, in a highly scattered state, when no voltage is present, according to the present invention.

Referring now to FIG. 1, illustrated in simplified sectional view is a portion of a liquid crystal display screen 10 according to the present invention. Liquid crystal display screen 10 includes a plurality of spheres 12, having encapsulated therein a liquid crystal medium 14. During the fabrication of display screen 10, the liquid crystal medium 14 undergoes a physical or chemical reaction when dispersed in polymer material 16, thereby forming the spherical or elliptical shapes, which includes a grouping or plurality of liquid crystal molecules 15.

Typically when dynamic scattering type liquid crystal materials are used and no voltage is applied, incident light is highly scattered and the resultant screen is opaque. When a proper voltage is applied, the directors of the liquid crystal molecules 15 are aligned, and the resultant screen is clear. In the laser display projection screen of the present invention, an opaque screen is utilized, thus light incident upon screen 10 is highly scattered.

Referring again to FIG. 1, liquid crystal medium 14, more particularly spheres 12 and polymer material 16, is sandwiched between two transparent plates 18. Plates 18 are transparent and generally formed of a transparent glass material or a transparent plastic material and positioned to provide for a viewing screen. Each plate 18 has positioned on a surface 19, a clear electrically conductive material layer 20, such as indium-tin-oxide (ITO), or the like. A driver source 22, is in electrical interface with electrically conductive material layers 20, so as to provide for a voltage during operation of screen 10. As illustrated in FIG. 1, screen 10 is absent the presence of a drive voltage and therefore incident light is reflected in a highly scattered state as indicated by directional arrows 24.

Figure 2:
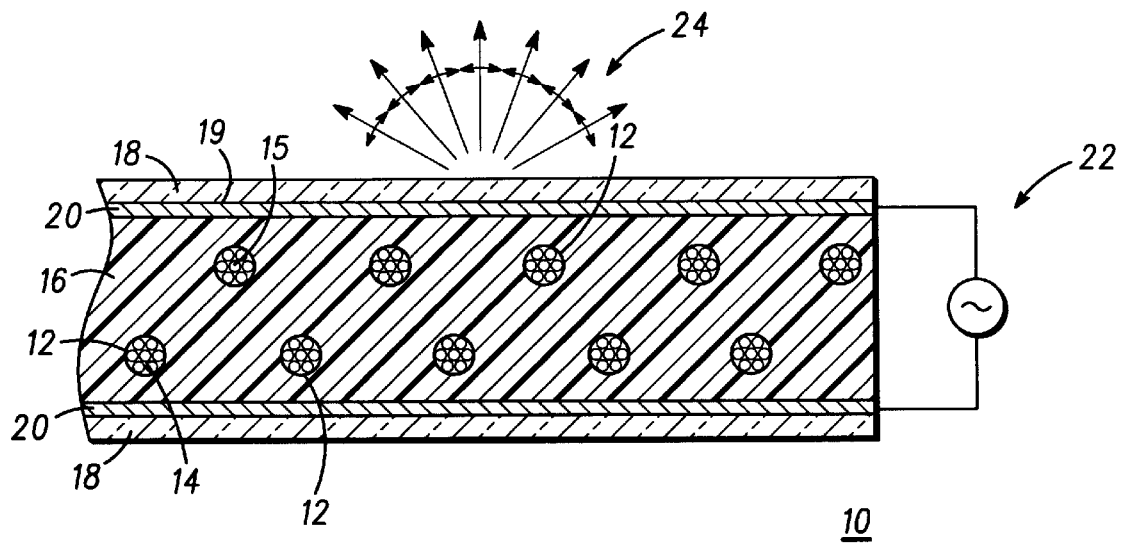
FIG. 2 is a simplified sectional view, illustrating a portion of a liquid crystal projection display screen, including a liquid crystal material, when under the influence of a high frequency, low voltage, according to the present invention.

Referring now to FIG. 2, illustrated is non-speckle laser display projection display screen 10 when under the influence of a voltage. Display screen 10 in this particular drawings is exactly the same as display screen 10 of FIG. 1, except in this particular view, display screen 10 is under the influence of a high frequency, low voltage, as indicated by the closed circuitry of driver source 22. This influence of a voltage provides for the vibrating (as indicated by the directional arrows 24) of glass spheres 12, more particularly liquid crystal material 14. This causes the reflected, scattered light to "vibrate", which destroys the interference pattern of the reflected light and thus eliminates the speckle effect in the generated display image. The liquid crystal material 14 need only move on the order of one wavelength of light to defeat the speckle pattern at a frequency of higher than 60 Hz. It should be understood that a frequency of higher than 60 Hz is disclosed in the preferred embodiment. This stating of a frequency of higher than 60 Hz is intended to include a frequency of only slightly higher than 60 Hz to a frequency of much higher than 60 Hz, whichever is deemed best to vibrate liquid crystal material 14. Often frequencies from very low to very high can be used. This vibrating of liquid crystal material 14 provides for a change in the speckle pattern, and to the eye, the displayed image will appear to be smooth and look like there is no speckle.

Liquid crystal material 14 is disclosed as a dynamic scattering type liquid crystal material and includes either chiral smectic liquid crystals or nematic liquid crystals. In the preferred embodiment liquid crystal material 14 is disclosed as a polymer-dispersed liquid crystal (PDLC) as previously described. Other types of liquid crystal materials and the techniques by which they are fabricated for use include nematic curvilinear aligned phase (NCAP) liquid crystal material, microencapsulation of the liquid crystal material in a polymer film, or a microporous film having a liquid crystal material imbibed therein (discussed presently).

Figure 3:
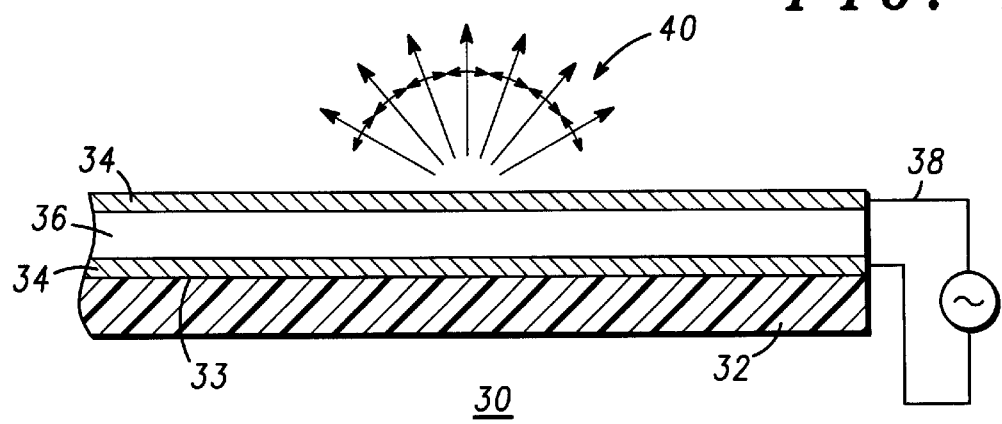
FIG. 3 is a simplified sectional view, illustrating a second embodiment of the liquid crystal projection display screen according to the present invention.

Referring now to FIG. 3, illustrated is a simplified sectional view of a second embodiment of the liquid crystal projection display screen, referenced 30, according to the present invention. In this particular embodiment, liquid crystal screen 30 includes a plate 32 having formed thereon an uppermost surface 33, an electrically conductive material 34. Similar to plate 18 of FIGS. 1 and 2, plate 32 is generally formed of a glass material or a plastic material. Plate 32 has positioned on surface 33, electrically conductive material layer 34, such as indium-tin-oxide (ITO), or the like. Next, a polymer film 36 having a liquid crystal material imbibed therein, or fabricated such as to form microencapsulation of a plurality of liquid crystal molecules, is laminated on an uppermost surface 35 of electrically conductive material layer 34. A second electrically conductive material layer 34 is formed on a surface of polymer film layer 36 and serves as the second electrical contact for screen 30. A driver source 38, is in electrical interface with electrically conductive material layers 34, so as to provide for a voltage during operation of screen 30.

When under the influence of a voltage, the liquid crystal molecules contained in polymer film 36 vibrate. This causes the reflected, scattered light to "vibrate" (as indicated by directional arrows 40), which destroys the interference pattern of the reflected light and thus eliminates the speckle effect in the generated display image. As previously stated, the liquid crystal material need only move on the order of one wavelength of light to defeat the speckle pattern at a frequency of higher than 60 Hz. It should be understood that a frequency of higher than 60 Hz is disclosed in the preferred embodiment. This vibrating of liquid crystal material provides for a change in the speckle pattern, and to the eye, the displayed image will appear to be smooth and look like there is no speckle.

Figure 4:
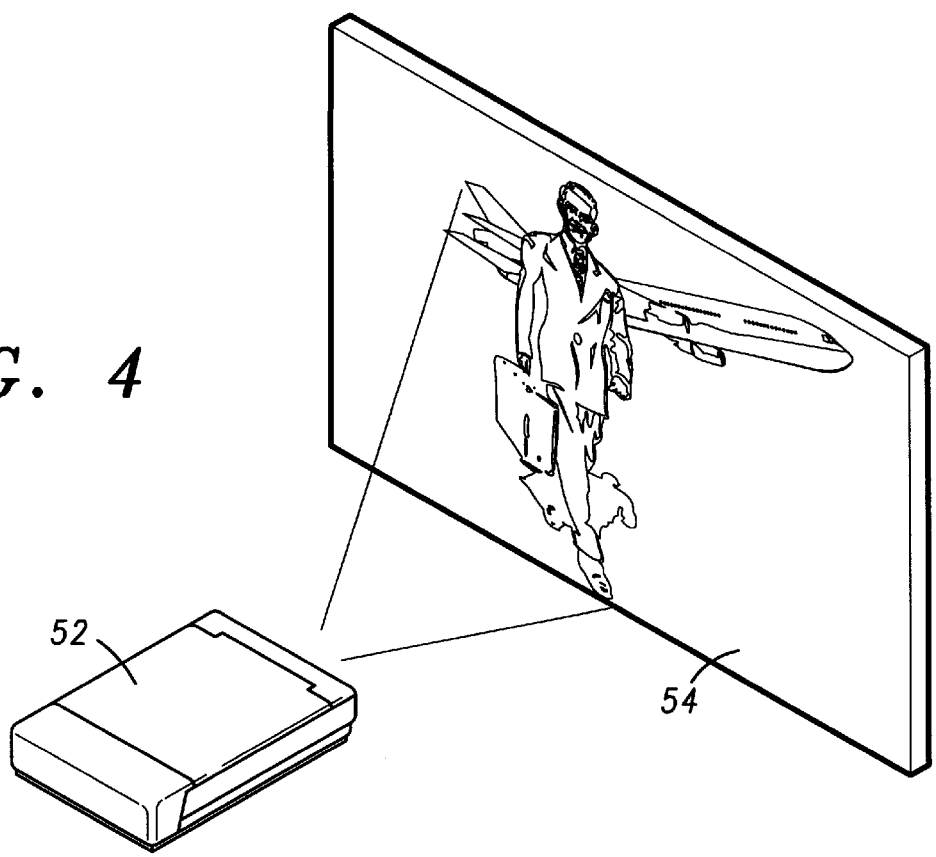
FIG. 4 is a simplified isometric view of the non-speckle liquid crystal projection display system according to the present invention.

Referring now to FIG. 4, illustrated is a non-speckle liquid crystal projection display system 50 according to the present invention. Display system 50 includes an image source 52 and liquid crystal projection display screen 54. Liquid crystal projection display screen 54 is fabricated generally according to the above disclosed embodiment as described with regard to FIGS. 1 and 2. Display screen 54 is disclosed as including small screens, such as book size screen (5"×7"), folder size screen (8"×11"), legal size screen (A4), and large screens for applications such as home theaters, movies, etc. In the preferred embodiment, display screen 54 is disclosed as being pliable in form, so as to allow for the rolling up, or storing, of display screen 54 when not in use.

Figure 5:
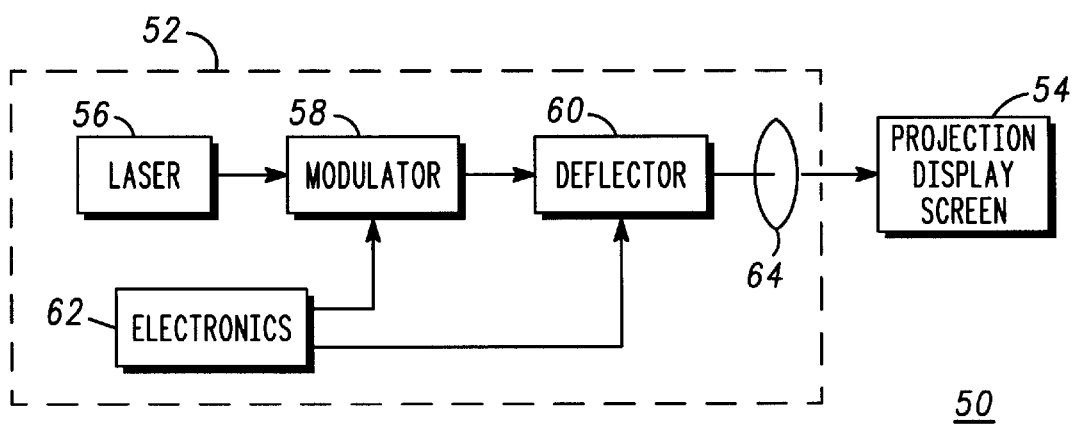
FIG. 5 is a block diagram of a non-speckle liquid crystal projection display system in accordance with the present invention.

Referring now to FIG. 5, illustrated in a block diagram is display system 50 according to the present invention. Illustrated is an imaging device, more particularly image source 52, including a laser 56, which may be any of the well known lasers including solid state lasers, such as vertical cavity surface emitting lasers (VCSELs), diode lasers, diode-pumped lasers, etc. Laser 56 supplies a coherent light beam to a modulator 58. Modulator 58 impresses video information onto the light beam generally by modulating the intensity of the light beam as, for example, by providing changes in the power level of laser 56. Depending upon the application, the modulation could be as simple as turning laser 56 off and on, which essentially translates into a digital system. Acousto-optic modulators are one of the preferred modulators for most applications, but other techniques, such as electro-optics and mechanical are completely feasible. Electronics 62 are included for controlling modulator 58 and deflection system 60.

The modulated light beam from modulator 58 is directed to a deflection system 60. A lens system 64 is used to focus the light beam from deflection system 60 onto liquid crystal projection display screen 54. The purpose of deflection system 60 is to scan the modulated light beam onto liquid crystal projection display screen 54. There are many possible configurations for deflection system 60 and lens system 64, depending upon the application of the display and how it is desired to form the image on projection display screen 54.

As described, in display system 50, scanning techniques are employed to create a high resolution image from the laser light source. This scanning action forms what appears to the observer to be a high resolution integrated image. Those skilled in the art will appreciate that scanning allows a full page display to be created from a small number of light sources. In this particular system the resultant integrated image is viewable as a projected image.

In the preferred embodiment, the use of scanning techniques to bring about the scanning of the light emitted by laser 56, allows for a display system into which the scanning technique is included to remain small in size and permits it to be incorporated into miniature portable electronic devices such personal digital assistants (PDAs), cellular phones, pagers, or the like.

Thus, a new and improved non-speckle liquid crystal projection display screen and display system which is intended for use with a portable electronic device for the generation of a non-speckle projection image display is disclosed which is relatively easy and inexpensive to manufacture. The display screen includes a liquid crystal material, that when under the influence of a high frequency, low voltage, provides for the generation of a high resolution non-speckle projection image display.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A non-speckle liquid crystal projection display comprising:
   a liquid crystal material, including a plurality of liquid crystal molecules dispersed in a polymer material, characterized as scattering light incident thereon;
   a voltage source in electrical interface with the liquid crystal material, the voltage source characterized as delivering a voltage having a frequency of greater than 60 Hz to the plurality of liquid crystal molecules thereby inducing temporal coherence reduction in an image projected through the liquid crystal material and thus averaging the speckle effect by vibrating the plurality of liquid crystal molecules when under the influence of a voltage; and
   at least one transparent plate positioned to provide for a viewing screen.

2. A non-speckle liquid crystal projection display as claimed in claim 1 wherein the liquid crystal material includes one of nematic liquid crystal material or chiral smectic liquid crystal material.

3. A non-speckle liquid crystal projection display as claimed in claim 2 wherein the plurality of liquid crystal molecules are microencapsulated in a polymer film material, the polymer film material being laminated on a surface of the at least one transparent plate, and in electrical interface with the voltage source.

4. A non-speckle liquid crystal projection display as claimed in claim 2 wherein the plurality of liquid crystal molecules are imbibed on a microporous film, the microporous film being laminated on a surface of the at least one transparent plate, and in electrical interface with the voltage source.

5. A non-speckle liquid crystal projection display comprising:
   a liquid crystal material, including a plurality of liquid crystal molecules dispersed in a polymer material;
   a voltage source in electrical interface with the liquid crystal material, the voltage source characterized as inducing temporal coherence reduction in an image projected through the liquid crystal material and thus averaging the speckle effect by vibrating the plurality of liquid crystal molecules when under the influence of the voltage, the voltage source further characterized as delivering a voltage having a frequency of greater than 60 Hz to the plurality of liquid crystal molecules; and
   at least two transparent plates having sandwiched therebetween a plurality of electrically conductive material layers and the liquid crystal material.

6. A non-speckle liquid crystal projection display as claimed in claim 1 wherein the liquid crystal material is a dynamic scattering type liquid crystal material.

7. A non-speckle liquid crystal projection display as claimed in claim 6 wherein the liquid crystal material includes one of nematic liquid crystal material or chiral smectic liquid crystal material.

8. A non-speckle liquid crystal projection display as claimed in claim 5 wherein the plurality of liquid crystal molecules are microencapsulated in a polymer film, the polymer film being laminated on a surface of an electrically conductive material layer formed on at least one transparent plate, and in electrical interface with the voltage source.

9. A non-speckle liquid crystal projection display as claimed in claim 5 wherein the plurality of liquid crystal molecules are imbibed on a microporous film, the microporous film being laminated on a surface of an electrically conductive material layer formed on at least one transparent plate, and in electrical interface with the voltage source.

10. A non-speckle liquid crystal projection display system comprising:
    a liquid crystal projection display screen including two transparent plates having sandwiched therebetween a liquid crystal material, including a plurality of liquid crystal molecules dispersed in a polymer material, in electrical interface with a voltage source, wherein the voltage source delivers a voltage having a frequency of greater than 60 Hz to the plurality of liquid crystal molecules, the plurality of liquid crystal molecules characterized as undergoing a vibrational movement and thus a reduction in temporal coherence in an image projected through the liquid crystal material thereby averaging the speckle effect in response to the voltage applied thereto by the voltage source; and an image source for projecting the image onto the liquid crystal projection display screen.

11. A non-speckle liquid crystal projection display system as claimed in claim 10 wherein the plurality of liquid crystal molecules are microencapsulated in a polymer film being laminated on a surface of an electrically conductive materal layer formed on at least one transparent plate, and in electrical interface with the voltage source.

12. A non-speckle liquid crystal projection display system as claimed in claim 10 wherein the plurality of liquid crystal molecules are imbibed on a microporous film, the microporous film being laminated on a surface of an electrically conductive material layer formed on at least one transparent plate, and in electrical interface with the voltage source.

13. A non-speckle liquid crystal projection display system as claimed in claim 10 wherein the image source includes at least one laser diode and a deflection system for scanning light emitted by the laser diode onto the liquid crystal projection display screen.

* * * * *

UNITED STATES PATENT AND TRADEMARK OFFICE
CERTIFICATE OF CORRECTION

PATENT NO.   : 6,122,023  
DATED        : September 19, 2000  
INVENTOR(S)  : Diana Chen et al.

It is certified that error appears in the above-identified patent and that said Letters Patent is hereby corrected as shown below:

Column 6,
Line 40, delete "1" and add -- 5 --.

Signed and Sealed this

Twenty-seventh Day of August, 2002

*Attest:*

JAMES E. ROGAN
*Attesting Officer*   *Director of the United States Patent and Trademark Office*